United States Patent
Hayashi (10) Patent No.: US 9,718,386 B2
(45) Date of Patent: Aug. 1, 2017

(54) VEHICLE SEAT HAVING A SEATBELT ANCHOR BRACKET

(71) Applicants: TOYOTA BOSHOKU KABUSHIKI KAISHA, Aichi-ken (JP); SHIROKI CORPORATION, Kanagawa (JP)

(72) Inventor: Hiroaki Hayashi, Oobu (JP)

(73) Assignees: TOYOTA BOSHOKU KABUSHIKI KAISHA, Aichi-Ken (JP); SHIROKI CORPORATION, Kanagawa (JP)

(*) Notice: Subject to any disclaimer, the term of this patent is extended or adjusted under 35 U.S.C. 154(b) by 57 days.

(21) Appl. No.: 14/693,091

(22) Filed: Apr. 22, 2015

(65) Prior Publication Data
US 2015/0307006 A1    Oct. 29, 2015

(30) Foreign Application Priority Data

Apr. 25, 2014  (JP) .................................. 2014-091076
Apr. 1, 2015   (JP) .................................. 2015-075163

(51) Int. Cl.
*B60N 2/68*     (2006.01)
*B60N 2/07*     (2006.01)
(Continued)

(52) U.S. Cl.
CPC ............ *B60N 2/68* (2013.01); *B60N 2/0702* (2013.01); *B60N 2/0705* (2013.01);
(Continued)

(58) Field of Classification Search
CPC . B60R 22/22; B60R 22/26; B60R 2022/1806; B60N 2/68; B60N 2/1615
See application file for complete search history.

(56) References Cited

U.S. PATENT DOCUMENTS 6,974,192 B2 * 12/2005 Miwa ..................... B60N 2/002
                                                177/144
7,658,443 B2 *  2/2010 Musale ................ B60N 2/1615
                                                297/216.1
(Continued)

FOREIGN PATENT DOCUMENTS

CN    101987588    3/2011
CN    102826024   12/2012
(Continued)

OTHER PUBLICATIONS

Chinese Office Action for CN App. No. 201510200934.4 mailed on Dec. 23, 2016, along with English-language translation thereof.

*Primary Examiner* — David R Dunn
*Assistant Examiner* — Tania Abraham
(74) *Attorney, Agent, or Firm* — Greenblum & Bernstein, P.L.C.

(57) ABSTRACT

A vehicle seat includes a side frame of a seat cushion having a side frame opposing portion extending in a front-rear direction of the seat cushion, and a bracket member disposed below the side frame having a bracket opposing portion extending in the front-rear direction and opposing the side frame opposing portion. The side frame opposing portion and the bracket opposing portion are provided such that the side frame opposing portion and the bracket opposing portion come in contact with each other in a state in which the seat cushion sinks rearward and downward when a load acted on the vehicle seat from behind is transmitted to the seat cushion from the seat back via a connection part. An arrangement interval between the bracket opposing portion and the side frame opposing portion is smaller in a front side than in a rear side in the front-rear direction.

8 Claims, 8 Drawing Sheets

(51) Int. Cl.
*B60N 2/22* (2006.01)
*B60N 2/64* (2006.01)
*B60R 22/22* (2006.01)
*B60R 22/26* (2006.01)
*B60N 2/16* (2006.01)
*B60R 22/18* (2006.01)

(52) U.S. Cl.
CPC ......... *B60N 2/0715* (2013.01); *B60N 2/1615* (2013.01); *B60N 2/22* (2013.01); *B60N 2/64* (2013.01); *B60R 22/22* (2013.01); *B60R 22/26* (2013.01); *B60R 2022/1806* (2013.01)

(56) References Cited

U.S. PATENT DOCUMENTS

2012/0313408 A1* 12/2012 Nagata ................ B60N 2/4235
297/216.1
2014/0042784 A1  2/2014 Yoshitsuru et al.

FOREIGN PATENT DOCUMENTS

| FR | 2988665 A1 * | 10/2013 | ............. B60R 22/26 |
| JP | 07-108860 | 4/1995 | |
| JP | 2007-245910 | 9/2007 | |
| JP | 2011-51511 | 3/2011 | |
| JP | 2011-201327 | 10/2011 | |

* cited by examiner

VEHICLE SEAT HAVING A SEATBELT ANCHOR BRACKET

INCORPORATION BY REFERENCE

The disclosure of Japanese Patent Application No. 2014-091076 filed on Apr. 25, 2014 and Japanese Patent Application No. 2015-075163 filed on Apr. 1, 2015 each including the specification, drawings and abstract is incorporated herein by reference in its entirety.

BACKGROUND OF THE INVENTION

1. Field of the Invention

The invention relates to a vehicle seat.

2. Description of Related Art

Figure 8:
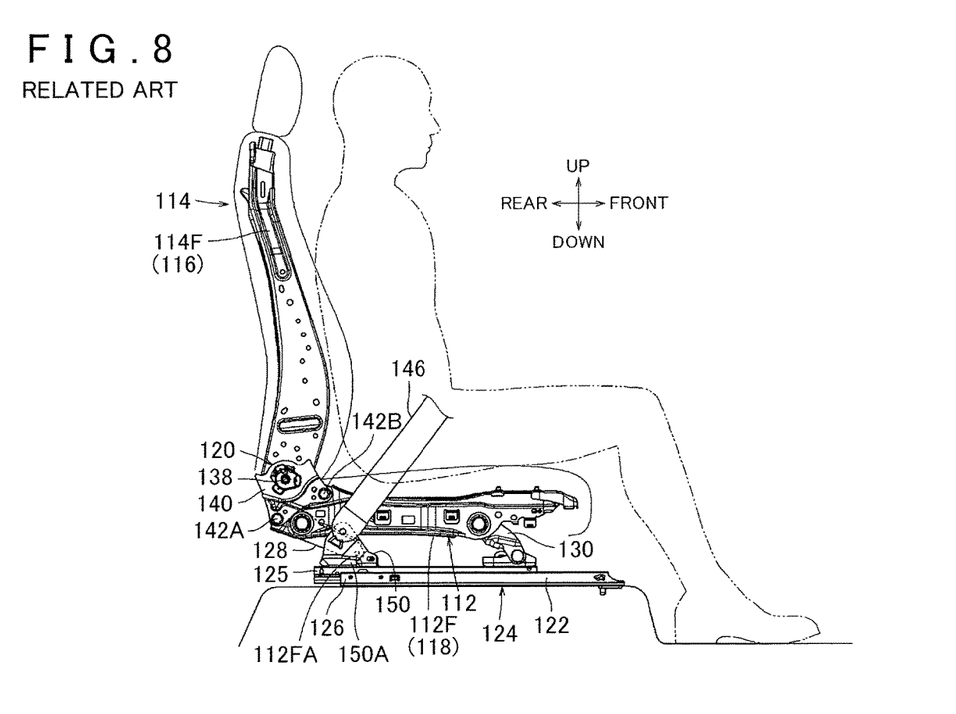
FIG. 8 is a side view for explaining a conventional vehicle seat.

As shown in FIG. 8, a vehicle seat (hereinafter sometimes simply referred to as a "seat") provided in a vehicle such as an automobile is constituted by a seat cushion 112 serving as a seat part for a seated person and a seat back 114 that receives the back of the seated person. The seat cushion 112 and the seat back 114 are normally connected to each other via a reclining mechanism 120, and the seat back 114 is tiltable in a front-rear direction (a left-right direction in the drawing). In the vehicle seat in FIG. 8, the reclining mechanism 120 is disposed via reclining plates 140.

The seat back 114 and the seat cushion 112 include a back frame 114F and a cushion frame 112F that form a frame of the vehicle seat, and each of the back frame 114F and the cushion frame 112F is formed into a frame shape. The back frame 114F and the cushion frame 112F include side frames 116 and 118 on the right and left sides thereof. Each of the side frames 116 of the back frame 114F and each of the side frames 118 of the cushion frame 112F are connected to each other via the reclining plate 140 described above. The reclining plate 140 is pivotably connected to the side frame 118 of the cushion frame 112F at two connection parts 142A and 142B using, for example, a bolt and a nut. The side frame 116 of the back frame 114F is tiltably and firmly connected to the reclining plate 140 using the reclining mechanism such as an engagement mechanism. The tilt operation with the reclining mechanism is performed about a shaft 138.

The vehicle seat is usually installed on the surface of a floor 122 such that the position in the front-rear direction is adjustable. Accordingly, the seat cushion 112 is disposed on the surface of the floor 122 via seat slide rail mechanisms 124. In each of the seat slide rail mechanisms 124, a lower rail 126 on the floor 122 side and an upper rail 125 on the seat cushion 112 side are slidably fitted to each other. In addition, the side frame 118 of the seat cushion 112 and the upper rail 125 are connected to each other using connection brackets 128 and 130 disposed in the front and the rear. With this, the seat is movable in the front-rear direction relative to the floor 122.

Note that the vehicle seat is provided with a seat belt device that holds the body of the seated person (occupant) from the viewpoint of safety of the occupant. Each of Japanese Patent Application Publication No. 7-108860 (JP 7-108860 A) and Japanese Patent Application Publication No. 2011-201327 (JP 2011-201327 A) describes a mounting structure of the seat belt device. A large load is applied to one end mounting part (belt anchor) of a seat belt 146 at the time of collision of a vehicle, and hence a seat belt anchor bracket 150 is mounted to the upper rail 125 of the seat slide rail mechanism 124 and the seat belt 146 is supported using the seat belt anchor bracket 150. With this, even in the case where the seat slides in the front-rear direction, it is possible to hold the occupant seated in the seat using the seat belt 146 appropriately. Note that the seat belt anchor bracket 150 is disposed in the rear of the seat cushion 112 such that the seat belt is properly attached to the seated person.

Incidentally, in the vehicle seat shown in FIG. 8, when an excessive load acts from behind as in the case where another vehicle collides with the vehicle from behind, an acting force for moving the seated person rearward relative to the seat is applied to the seated person. The rearward acting force applied to the seated person is received by the seat back 114, and is transmitted from the side frame 116 of the seat back 114 to the side frame 118 of the seat cushion 112 via the reclining plate 140. The seat cushion 112 is supported on the floor 122 via the front and rear connection brackets 128 and 130. The rearward acting force exerted on the entire seat starts to deform the seat such that the rear end portion of the seat cushion 112 sinks rearward and downward.

In order to restrict the sinking of the rear end portion of the seat cushion 112, portions (opposing portions) that come in contact with each other when the rear end portion of the side frame 118 is displaced downward are formed in the seat belt anchor bracket 150 and the side frame 118 of the seat cushion 112. In general, the opposing portions of the side frame 118 of the seat cushion 112 and the seat belt anchor bracket 150 are configured such that the entire opposing portions come in contact with each other at the same time.

In the above-described configuration shown in FIG. 8, the entire portions of the opposing portions of the side frame 118 of the seat cushion 112 and the seat belt anchor bracket 150 provided in the upper rail 125 of the seat slide rail mechanism 124 come in contact with each other substantially at the same time at the time of the collision from behind, and the load from the side frame 118 of the seat cushion 112 is received by the seat belt anchor bracket 150. Accordingly, a stress is concentrated on connection parts between the side frame 118 and the reclining plate 140, and there is a possibility that the bolts and the nuts in the connection parts are broken. Accordingly, it has been necessary to provide the connection part with a strength that allows the connection part to bear the stress concentration. Specifically, since the back frame 114F and the reclining plate 140 are firmly connected to each other using the reclining mechanism, the stress is concentrated on the two connection parts 142A and 142B between the reclining plate 140 and the cushion frame 112F. In particular, the seat back 114 tilts rearward at the time of the collision from behind, and hence the stress concentration occurs in the connection part 142B, and there has been a possibility that the bolt and the nut in the connection 142B is broken.

SUMMARY OF THE INVENTION

The invention provides a vehicle seat in which durability of a connection part between a seat cushion and a seat back is increased by gradually transmitting a stress caused by a load acting on the vehicle seat from behind to a member on a floor side.

An aspect of the invention relates to a vehicle seat including: a seat back; a seat cushion having a side frame; a connection part connecting the seat back and the seat cushion; and a bracket member on a floor side disposed below the side frame. The side frame has a side frame opposing portion extending in a front-rear direction of the seat cushion, and the bracket member on the floor side has a bracket opposing portion extending in the front-rear direction and opposing the side frame opposing portion. The side frame opposing portion and the bracket opposing portion are provided such that the side frame opposing portion and the bracket opposing portion come in contact with each other in a state in which the seat cushion sinks rearward and downward when a load acted on the vehicle seat from behind is transmitted to the seat cushion from the seat back via the connection part. An arrangement interval between the bracket opposing portion and the side frame opposing portion is smaller in a front side than in a rear side in the front-rear direction of the seat cushion.

According to the above configuration, when the load acts on the vehicle seat from behind, the opposing portion of the side frame and the opposing portion of the bracket on the floor side gradually come in contact with each other from the front side toward the rear side. Accordingly, the stress is not concentrated on the connection part between the seat cushion and the seat back. With this, it is possible to improve the durability of the connection part.

A cross-sectional shape of the bracket member on the floor side in a left-right direction of the seat cushion may be varied in the front-rear direction such that the arrangement interval between the bracket opposing portion and the side frame opposing portion is smaller in the front side than in the rear side. According to the above configuration, it is possible to easily vary the arrangement interval between the side frame opposing portion and the bracket opposing portion by varying the cross-sectional shape of the bracket member on the floor side in a left-right direction in the front-rear direction.

The bracket member on the floor side may be a seat belt anchor bracket. When the seat belt anchor bracket is used as the bracket member on the floor side in this manner, it is not necessary to provide a dedicated bracket member, and it is possible to simplify the configuration.

The seat belt anchor bracket may be mounted to an upper rail of a seat slide rail mechanism. According to the above configuration, even in the case where the position of the seat in the front-rear direction is changed using the seat slide rail mechanism, it is possible to achieve dispersion of the stress caused by the load that acts from behind using the seat belt anchor bracket.

The side frame opposing portion may be a lower end portion of the side frame, and the bracket opposing portion may be a side surface portion of the bracket member on the floor side. In addition, the side surface portion may be inclined upward relative to a bottom surface of the bracket member on the floor side, and a width of the side surface portion may be reduced such that an upper end of the side surface portion approaches the bottom surface with approach to a rear end of the side surface portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, an embodiment of the invention will be described by using the drawings. In the description of this embodiment, a vehicle seat provided in an automobile is described as an example. Note that directions used in the following description denote directions when viewed from a seated person in the case where the seated person is seated in the seat. In addition, in each drawing, the directions are indicated by arrows. Further, R and L used in reference numerals are used in the case where components on the left and right sides are distinguished from each other, and R indicates the component positioned on the right side and L indicates the component positioned on the left side.

Figure 1:
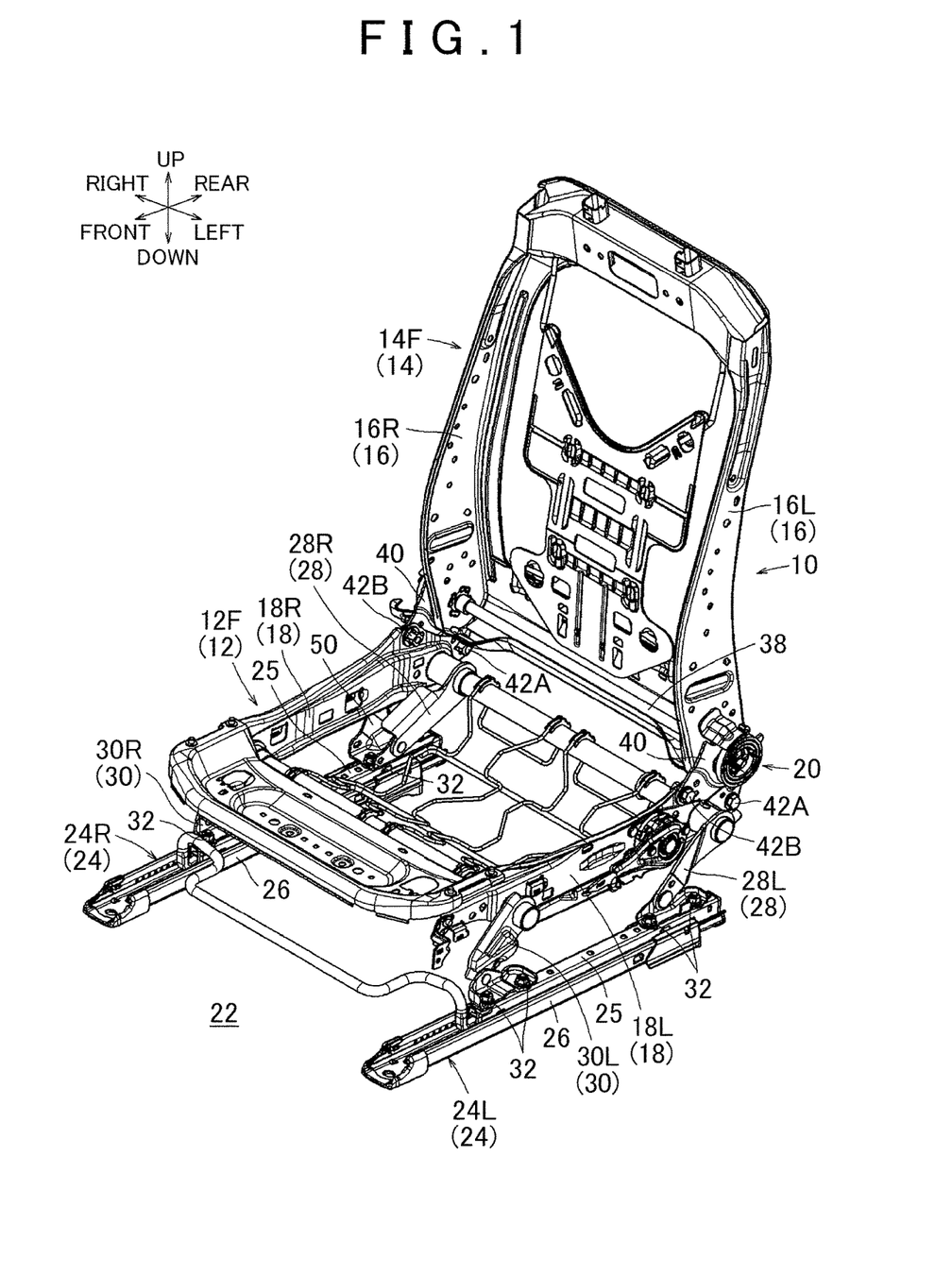
FIG. 1 is a perspective view showing a frame of a vehicle seat of an embodiment of the invention.

FIG. 1 shows the frame of a vehicle seat 10 provided in an automobile. The vehicle seat 10 is constituted by a seat cushion 12 serving as a seat for a seated person and a seat back 14 that supports the back of the seated person. The frames of the seat cushion 12 and the seat back 14 are formed by a cushion frame 12F and a back frame 14F, respectively. The back frame 14F has side frames 16L and 16R on the left and right sides thereof, and the entire back frame 14F is formed into a frame shape. The cushion frame 12F also has side frames 18L and 18R on the left and right sides thereof, and the entire cushion frame 12F is formed into a frame shape. The seat cushion 12 and the seat back 14 are connected to each other via a reclining mechanism 20 that connects the cushion frame 12F and the back frame 14F such that they can rotate about an axis, and the seat back 14 can tilt in a front-rear direction using the reclining mechanism 20.

Specifically, the reclining mechanisms 20 are disposed in connection parts between reclining plates 40 and lower ends of the side frames 16 of the seat back 14. Each of the reclining plates 40 is disposed as a member that connects the side frame 18 of the seat cushion 12 and the side frame 16 of the seat back 14. The side frame 18 of the seat cushion 12 and the reclining plate 40 are fastened together using fasteners 42A and 42B, each of which is constituted by a bolt and a nut, at a rear end portion of the side frame 18 of the seat cushion 12 and thereby integrated with each other. That is, the fastening of the side frame 18 of the seat cushion 12 and the reclining plate 40 is performed by the two fasteners 42A and 42B (two fastening parts). The side frame 16 of the seat back 14 is tiltably connected to the reclining plate 40 with a connection rod 38 used as an axis, and the side frame 16 thereof and the reclining plate 40 are firmly connected to each other using the reclining mechanism 20 such as an engagement mechanism. Consequently, a stress at the time of a collision from behind is concentrated on the two fasteners 42A and 42B. In particular, an acting force for tilting the seat back 14 rearward occurs at the time of the collision from behind, and hence the fastener 42B that is more likely to receive the acting force receives the stress.

On the surface of a floor 22 positioned below the side frames 18L and 18R on the left and right sides of the seat cushion 12, seat slide rail mechanisms 24 are disposed. In the embodiment, each of the seat slide rail mechanisms 24 is not disposed immediately below the side frame 18 but is disposed at a slightly offset position. The right seat slide rail mechanism 24R is disposed at a position slightly offset to the left (an inner direction of the seat) of the right side frame 18R in a width direction (a left-right direction) of the seat cushion 12, and the left seat slide rail mechanism 24L is disposed at a position slightly offset to the left (an outer direction of the seat) of the left side frame 18L.

Figure 2:
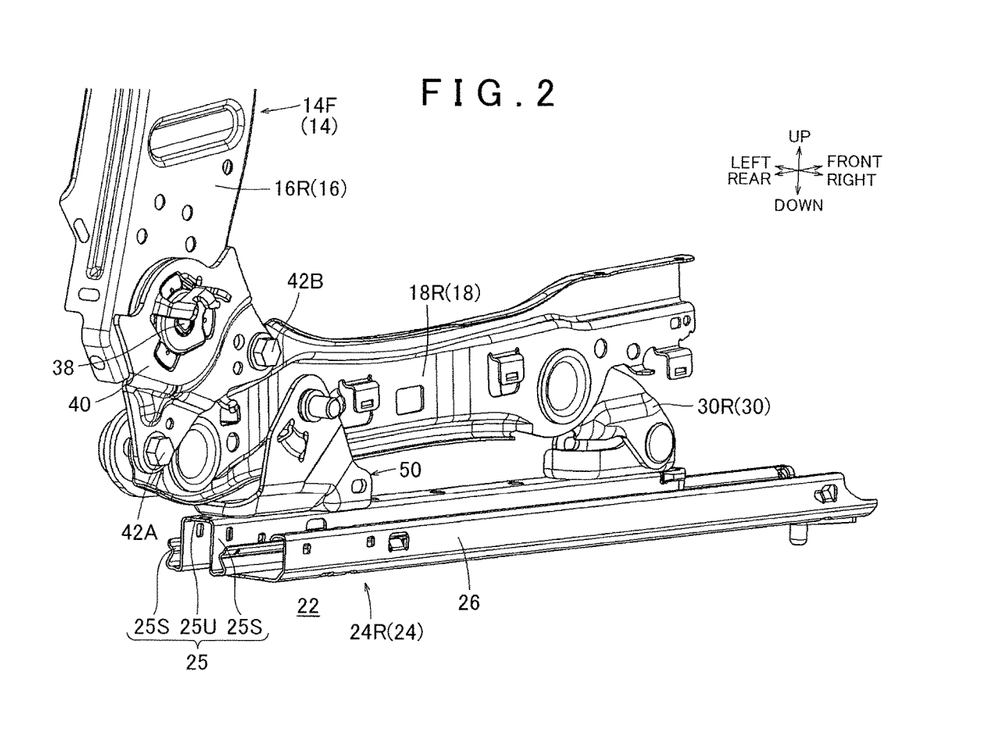
FIG. 2 is a perspective view of a side frame of a seat cushion and a seat belt anchor bracket disposed in a seat slide rail mechanism in FIG. 1 as viewed from the outside of the seat.

As shown in FIG. 2, the seat slide rail mechanism 24 is constituted by an upper rail 25 and a lower rail 26. The lower rail 26 is fixed to the floor 22. The upper rail 25 has an upper surface 25U, and left-right side surfaces 25S. With this, the transverse section of the upper rail has a hat shape. The upper rail 25 is slidably fitted in the lower rail 26. Note that the transverse section of the upper rail 25 is a cross section in a direction orthogonal to a longitudinal direction of the upper rail 25R.

In FIG. 1, the side frame 18 of the seat cushion 12 and the seat slide rail mechanism 24 are connected to each other via front-rear connection brackets 28 and 30. With this, the entire seat 10 is slidable in the front-rear direction using the seat slide rail mechanism 24, and the position of the seat 10 in the front-rear direction relative to the floor 22 can be adjusted. Thus, in the embodiment, the seat slide rail mechanism 24 functions as a seat support member on the floor 22 side.

The front and rear connection brackets 28R and 30R provided for the right side frame 18R are disposed at inner positions of the side frame 18R in the width direction (the left-right direction) of the seat. The front and rear connection brackets 28L and 30L provided for the left side frame 18L are disposed at outer positions of the side frame 18L in the width direction (the left-right direction) of the seat. Each of the connection brackets 28L, 28R, 30L, and 30R is joined to the upper surface 25U of the upper rail 25, fixed using a fastener 32 constituted by the bolt and the nut, and connected to the seat slide rail mechanism 24L or 24R.

Figure 3:
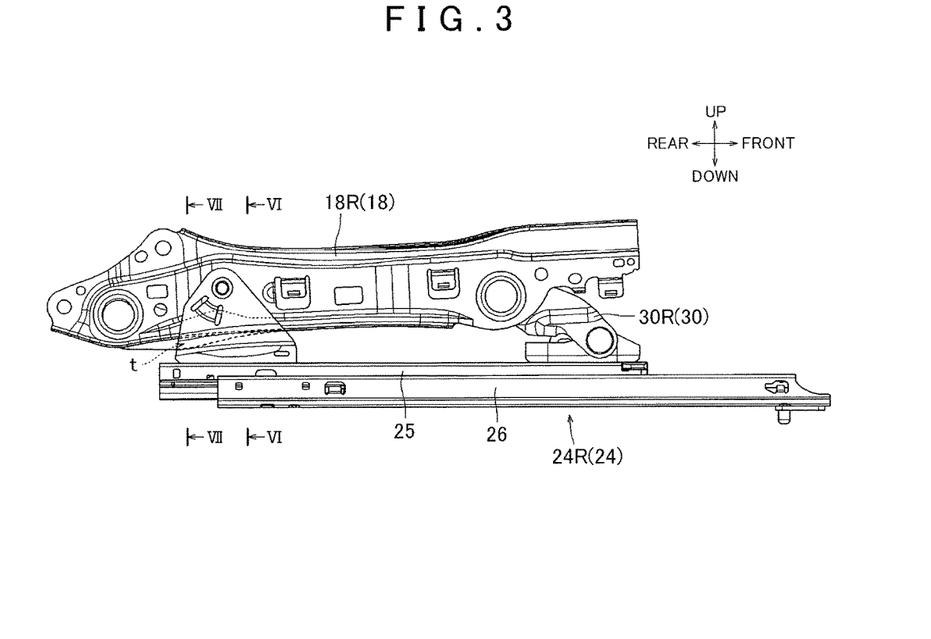
FIG. 3 is a side view of FIG. 2.
Figure 4:
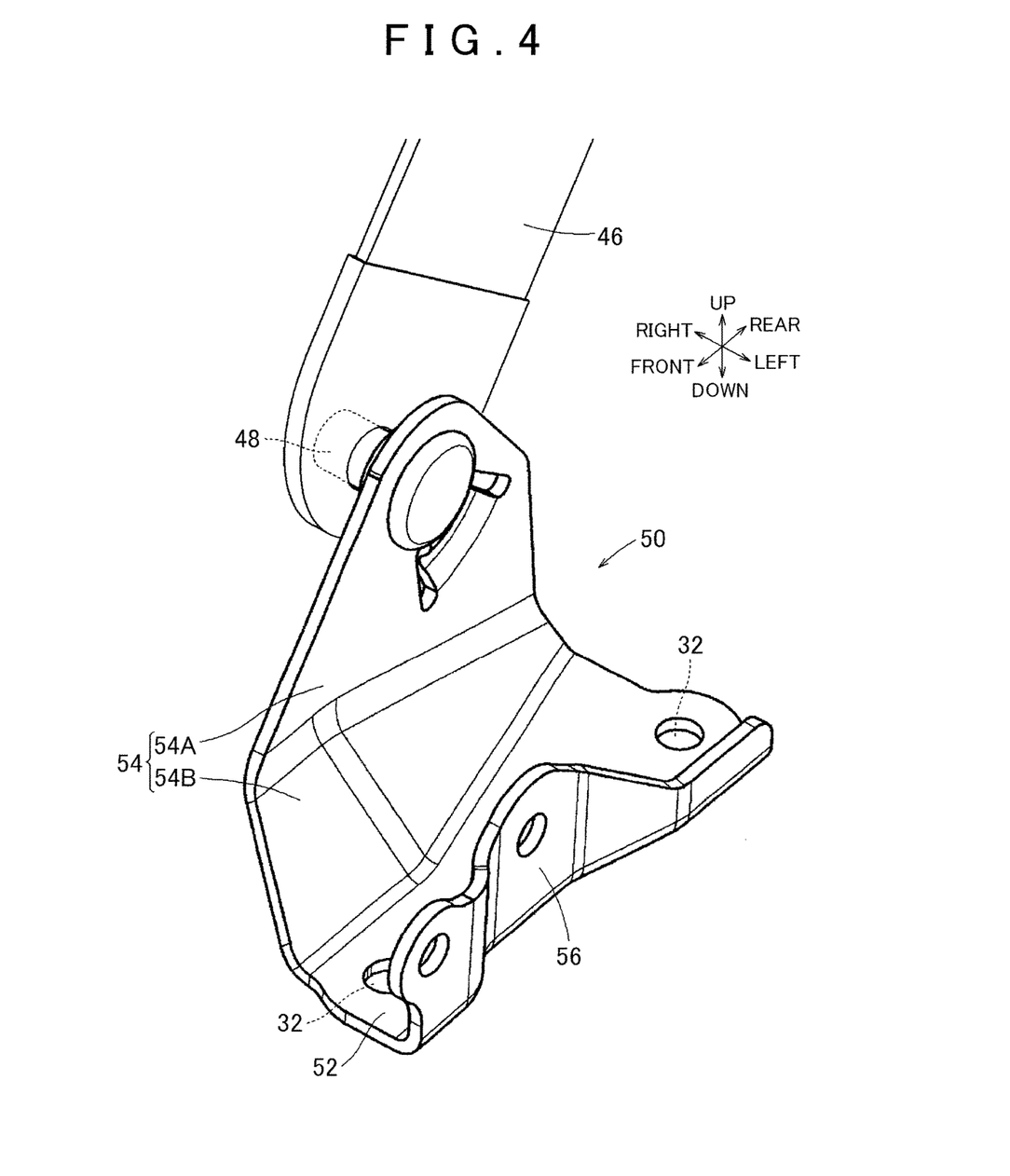
FIG. 4 is a perspective view of the seat belt anchor bracket.

A seat belt anchor bracket 50 functions as a bracket on the floor side. As shown in FIG. 1, the seat belt anchor bracket 50 is disposed at a rear position between the right side frame 18R of the seat cushion 12 and the seat slide rail mechanism 24R. The detailed structure of this bracket is shown in FIGS. 2 and 3, and a single unit of the seat belt anchor bracket 50 is shown in FIG. 4. Note that, in FIGS. 2 and 3, the depiction of the rear connection bracket 28R is omitted for the convenience of the depiction.

As shown in FIG. 4, the seat belt anchor bracket 50 includes a bottom surface 52, a right side surface 54, and a left side surface 56, its cross-sectional shape in the left-right direction is formed into a substantially U shape. The upper end of the right side surface 54 is formed to be higher than the upper end of the left side surface 56. The right side surface 54 is positioned outside the side frame 18R of the seat cushion 12, and the left side surface 56 is positioned inside the side frame 18R of the seat cushion 12. In the seat belt anchor bracket 50, the bottom surface 52 is placed in surface contact with the upper rail 25 of the seat slide rail mechanism 24R described above, fastened to the upper rail 25 using the fasteners 32 constituted by the bolts and the nuts, and integrated with the upper rail 25. In addition, the rear connection bracket 28R described above is disposed on the left side surface 56 (see FIG. 1).

The right side surface 54 of the seat belt anchor bracket 50 includes a vertical surface portion 54A at an upper position and an inclined surface portion 54B at a lower position. The inclined surface portion 54B is inclined upward relative to the bottom surface 52, and functions as a bracket opposing portion. The inclined surface portion 54B is formed so as to extend in the front-rear direction, and be gradually reduced in width with approach to the rear side from the front side. More specifically, the inclined surface portion 54B is formed so as to be reduced in width with approach to the rear end of the inclined surface portion 54B such that the upper end of the inclined surface portion 54B approaches the bottom surface 52. That is, the shape of the inclined surface portion 54B of the seat belt anchor bracket 50 in the front-rear direction is varied in the front-rear direction such that the cross-sectional shape (the traverse section shape) of the seat belt anchor bracket 50 in the left-right direction is varied in the front-rear direction.

An anchor pin 48 of a seat belt device is attached to the vertical surface portion 54A of the right side surface 54. A support end of a seat belt 46 is attached to the anchor pin 48. With this, a load acting on the seat belt 46 is transmitted to the seat belt anchor bracket 50, further transmitted to the floor 22 via the seat slide rail mechanism 24R, and is received by the floor 22. At this point, the seat belt anchor bracket 50 is mounted to the upper rail 25 of the seat slide rail mechanism 24R, and hence the seat belt anchor bracket 50 can move in the front-rear direction integrally with the main body of the seat 10. With this, even when the seat 10 is at any position in the front-rear direction, the seated person is capable of wearing the seat belt 46 appropriately at any time.

Figure 5:
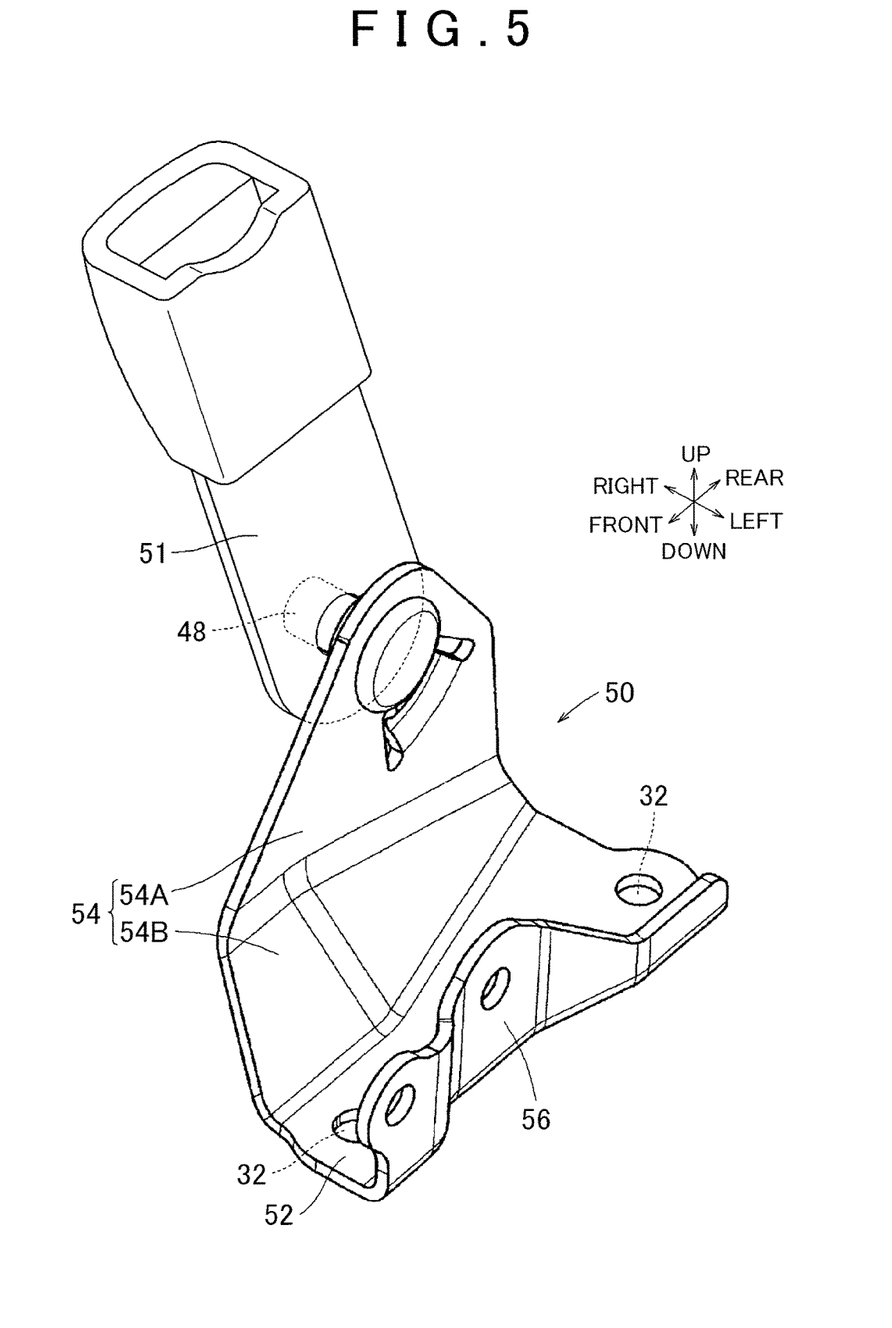
FIG. 5 is a perspective view of the seat belt anchor bracket to which a seat belt buckle is attached, in relation to FIG. 4.

FIG. 5 is a perspective view of the seat belt anchor bracket 50 depicted in relation to FIG. 4, in a case where a seat belt buckle 51 is attached to the anchor pin 48. Various members that constitute the seat belt 46 may be attached to the anchor pin 48 depending on, for example, the position of the seat 10.

Figure 6:
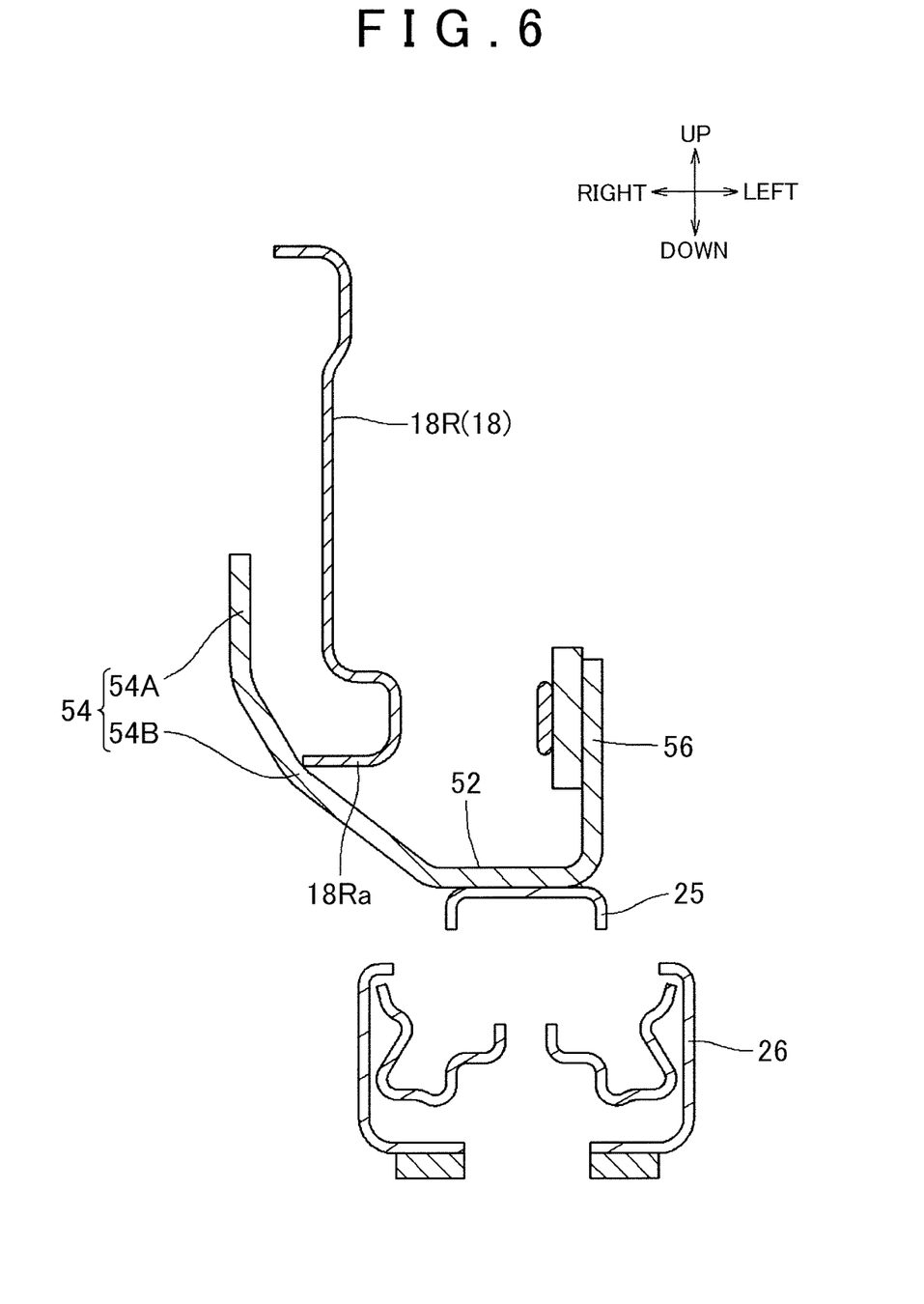
FIG. 6 is a cross-sectional view taken long the line VI-VI of FIG. 3.
Figure 7:
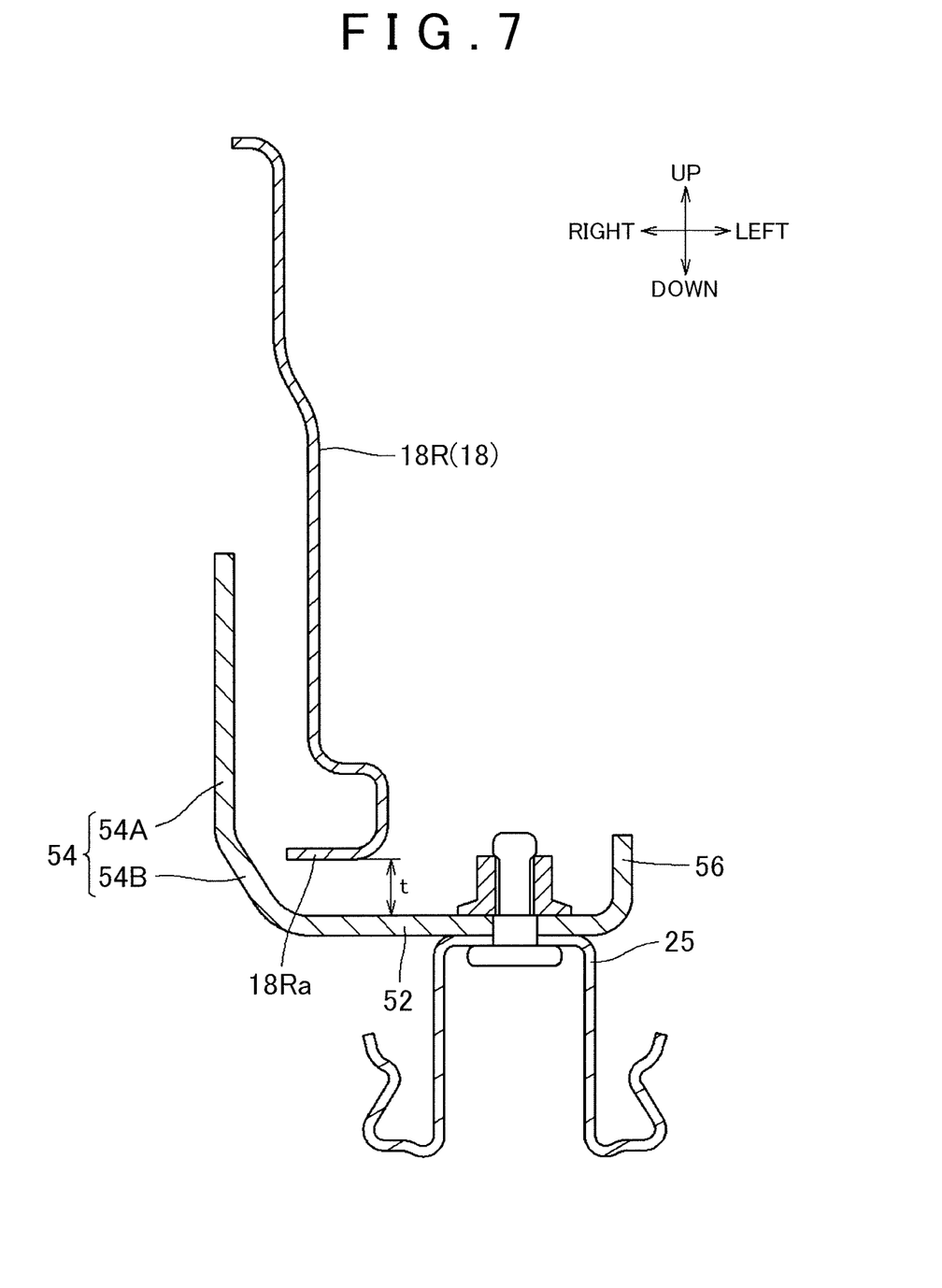
FIG. 7 is a cross-sectional view taken along the line VII-VII of FIG. 3.

The inclined surface portion 54B of the seat belt anchor bracket 50 and the right side frame 18R of the seat cushion 12 are disposed so as to oppose each other along an up-down direction that corresponds to a direction in which the acting force acts. The state is shown in FIGS. 6 and 7. FIG. 6 shows a cross-sectional view taken along the line VI-VI of FIG. 3, and FIG. 7 shows a cross-sectional view taken along the line VII-VII of FIG. 3. FIG. 6 shows the arrangement state of the inclined surface portion 54B and the side frame 18R at a front position, and FIG. 7 shows the arrangement state thereof at a rear position. As can be seen from the drawings, a lower end portion 18Ra of the side frame 18R extends in the front-rear direction, comes in contact with the inclined surface portion 54B of the seat belt anchor bracket 50 when the side frame 18R is displaced downward, and receives the load from the seat belt anchor bracket 50. Note that the cross-sectional shape of the lower end portion 18Ra of the side frame 18R is formed into a U shape (projecting shape for reinforcement). Based on the relationship of the arrangement state thereof, the lower end portion 18Ra of the side frame 18R functions as a side frame opposing portion.

An arrangement interval in the up-down direction between the inclined surface portion 54B of the seat belt anchor bracket 50 and the lower end portion 18Ra of the side frame 18R that function as the opposing portions of the embodiment of the invention is gradually increased from the front side toward the rear side. Conversely, when viewed from the rear, the arrangement interval between the inclined surface portion 54B of the seat belt anchor bracket 50 and the lower end portion 18Ra of the side frame 18R is gradually reduced toward the front side. Specifically, in the case of the embodiment, the lower end portion 18Ra of the side frame 18R is in contact with the inclined surface portion 54B of the seat belt anchor bracket 50 at the front position shown in FIG. 6. An interval t is set between the lower end portion 18Ra of the side frame 18R and the inclined surface portion 54B of the seat belt anchor bracket 50 at the rear position shown in FIG. 7. The interval t is gradually increased from the front position shown in FIG. 6 toward the rear position shown in FIG. 7. The change of the interval t is indicated by a thick broken line in FIG. 3.

The side frame 18R and the seat belt anchor bracket 50 of the embodiment are disposed so as to satisfy the above relationship. With this, when the side frame 18R is displaced so as to sink rearward and downward, the lower end portion 18Ra and the inclined surface portion 54B gradually come in contact with each other from the front side toward the rear side, and their contact area is increased. At this point, the sinking of the side frame 18R involves plastic deformation and elastic deformation. Consequently, the plastic deformation absorbs energy of the acting force acting on the side frame 18R.

Next, the operation of the seat 10 of the embodiment will be described. When an excessive load acts on the seat 10 from behind as in the case where another automobile collides with the rear of the automobile on which the seat 10 is installed, the acting force for moving the seated person rearward relative to the seat 10 is applied to the seated person. The rearward acting force applied to the seated person is received by the seat back 14, and is transmitted to the side frame 18 of the seat cushion 12 from the side frame 16 of the seat back 14 via the reclining plate 40. At this point, the transmission of the acting force from the side frame 16 of the seat back 14 to the reclining plate 40 is performed via the firm reclining mechanism, and the transmission of the acting force from the reclining plate 40 to the side frame 18 of the seat cushion 12 is performed via the two fasteners 42A and 42B. In the transmission of the acting force from the reclining plate 40 to the side frame 18 of the seat cushion 12, as described above, the stress is concentrated on the two fasteners 42A and 42B constituted by the bolts and the nuts. Since the fastener 42B of the two fasteners 42A and 42B is more likely to receive the stress, the fastener 42B may be broken first when the stress concentration occurs in the transmission system, and the seat back 14 may greatly sink rearward. Consequently, it is necessary to prevent the occurrence of the stress concentration at the time of the collision from behind. To cope with this, in the embodiment, the stress concentration is averted in the following manner.

The seat cushion 12 of the embodiment is supported on the floor 22 using the front and rear connection brackets 28 and 30. The rearward acting force exerted on the entire seat 10 at the time of the collision from behind as described above deforms the rear end portion of the seat cushion 12, specifically the rear end portion of the side frame 18 of the seat cushion 12 such that the rear end portion thereof sinks rearward and downward. As described above, the deformation involves the plastic deformation and the elastic deformation of the rear end portion of the side frame 18.

In the embodiment, the lower end portion 18Ra of the right side frame 18R is supported by the inclined surface portion 54B of the seat belt anchor bracket 50 that is disposed so as to oppose the lower end portion 18Ra, and the acting force for deforming the rear end portion of the side frame 18 of the seat cushion 12 such that the rear end portion thereof sinks rearward and downward is thereby received by the seat belt anchor bracket 50. The arrangement interval between the lower end portion 18Ra and the inclined surface portion 54B is gradually increased from the front position toward the rear position. Accordingly, with the sinking deformation of the rear end portion of the side frame 18, as shown in FIG. 5, the lower end portion 18Ra and the inclined surface portion 54B come in contact with each other at the front position first, and the seat belt anchor bracket 50 receives the load caused by the acting force from the side frame 18R. At this point, at the rear position shown in FIG. 6, the interval is formed between the lower end portion 18Ra and the inclined surface portion 54B, and hence the seat belt anchor bracket 50 does not receive the load from the side frame 18R. Thereafter, in response to the progress of the rearward sinking deformation of the side frame 18R, the contact between the lower end portion 18Ra and the inclined surface portion 54B progresses until the rear portions thereof come in contact with each other, and the entire lower end portion 18Ra and the entire inclined surface portion 54B receive the load eventually. Thus, the load from the side frame 18R is gradually received by the seat belt anchor bracket 50 in response to the sinking deformation of the rear end portion of the seat cushion 12 in the embodiment, and hence it is possible to avert the stress concentration. Consequently, it is possible to prevent the above-described breakage of a portion having a relatively low strength in the transmission system caused by the stress concentration.

Although the embodiment of the invention has been described thus far, the invention is not limited to the above embodiment, and other various embodiments can be carried out.

For example, in the above embodiment, the description has been given of the case where the bracket member on the floor side is the seat belt anchor bracket 50. The configuration can be simplified when the existing bracket member is used as the bracket member on the floor side in the invention in this manner, but a dedicated bracket member may also be provided. In addition, the bracket member on the floor side may also be used as a member having other uses.

In addition, in the above embodiment, although the inclined surface portion 54B is used as the opposing portion formed in the seat belt anchor bracket 50, the opposing portion does not need to have an inclined surface, and may also have a horizontal surface. That is, any configuration may be adopted as log as the arrangement interval between one opposing portion and the other opposing portion is varied in the front-rear direction in the configuration. The inclined surface portion 54B is used as the opposing portion in the embodiment for the convenience of a center console box disposed adjacent to the opposing portion.

Further, in the above embodiment, the seat belt anchor bracket 50 is mounted to the upper rail of the seat slide rail mechanism 24, but the seat belt anchor bracket 50 may also be mounted to the floor 22 directly in the case where the seat slide rail mechanism is not provided.

Furthermore, in the above embodiment, the fastener is constituted by the bolt and the nut, but a general-purpose fastener such as a rivet or the like may also be used.

The term vehicle may refer to any machine or conveyance that carries people or things from one place to another such as an automobile, a truck, a bus, a train, an aircraft, a boat, a vessel, and a submarine. However, it is noted that these examples are merely provided for purposes of enhancing understanding the present disclosure, and thus should not be construed as limiting.

What is claimed is:
1. A vehicle seat comprising:
   a seat back;
   a seat cushion having a side frame;
   a connection part connecting the seat back and the seat cushion; and a bracket member on a floor side of the vehicle seat that is disposed below the side frame, wherein the side frame has a side frame opposing portion extending in a front-rear direction of the seat cushion, the bracket member has a bracket opposing portion extending in the front-rear direction and opposing the side frame opposing portion, which extends along the bracket member in the front-rear direction, the side frame opposing portion and the bracket opposing portion are provided such that the side frame opposing portion and the bracket opposing portion gradually come into contact with each other from a front side of the vehicle seat toward a rear side of the vehicle seat in the front-rear direction in a state in which the seat cushion sinks rearward and downward when a load acted on the vehicle seat from behind is transmitted to the seat cushion from the seat back via the connection part, and an arrangement interval between the bracket opposing portion and the side frame opposing portion is smaller in a front side than in a rear side in the front-rear direction of the seat cushion.

2. The vehicle seat according to claim 1, wherein a cross-sectional shape of the bracket member in a left-right direction of the seat cushion is varied in the front-rear direction such that the arrangement interval between the bracket opposing portion and the side frame opposing portion is smaller in the front side than in the rear side.

3. The vehicle seat according to claim 1, wherein the bracket member is a seat belt anchor bracket.

4. The vehicle seat according to claim 3, wherein the seat belt anchor bracket is mounted to an upper rail of a seat slide rail mechanism.

5. The vehicle seat according to claim 1, wherein the side frame opposing portion is a lower end portion of the side frame, and the bracket opposing portion is a side surface portion of the bracket member.

6. The vehicle seat according to claim 5, wherein the side surface portion is inclined upward relative to a bottom surface of the bracket member on the floor side of the vehicle seat, and a width of the side surface portion in a left-right direction of the seat cushion is reduced such that an upper end of the side surface portion approaches the bottom surface of the bracket member as it extends from a front end to a rear end of the side surface portion in the front-rear direction.

7. The vehicle seat according to claim 1, wherein the arrangement interval between the bracket opposing portion and the side frame opposing portion is gradually smaller toward a front side than toward a rear side in the front-rear direction of the seat cushion.

8. The vehicle seat according to claim 1, wherein the bracket opposing portion is a side surface portion of the bracket member, and the side surface portion is located at a position higher than a position of a bottom surface of the bracket member fixed to a seat slide rail mechanism.

* * * * *